(No Model.) 3 Sheets—Sheet 1.

R. O. WICKES.
TELEGRAPH RELAY.

No. 450,272. Patented Apr. 14, 1891.

Witnesses
W. H. Courtland
Nellie L. Pope.

Inventor:-
ROBERT O. WICKES
BY HIS ATTORNEY
Edward P. Thompson (No Model.) 3 Sheets—Sheet 2.
R. O. WICKES.
TELEGRAPH RELAY.
No. 450,272. Patented Apr. 14, 1891.
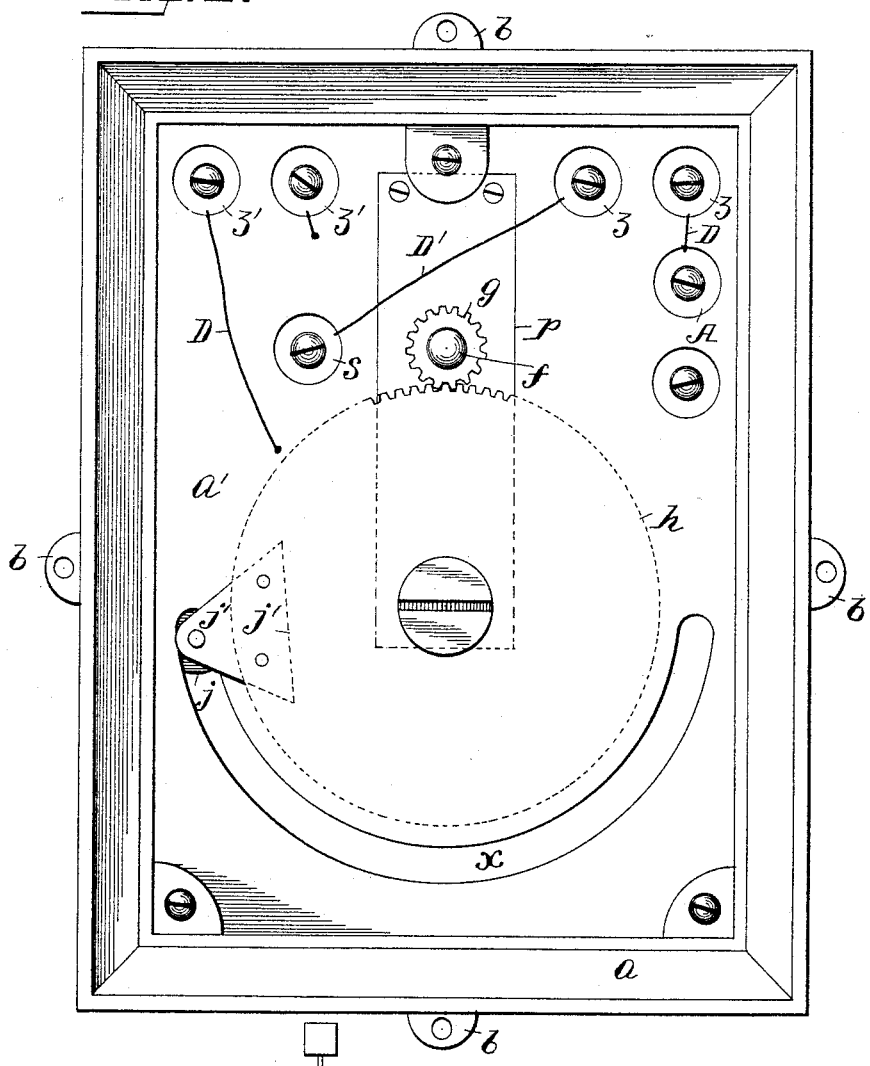
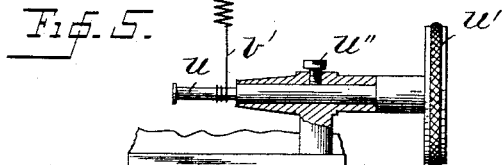
Witnesses
W. H. Courtland
Nellie L. Poke
Inventor
Robert O. Wickes
By his Attorney
Edward P. Thompson (No Model.) 3 Sheets—Sheet 3.

R. O. WICKES.
TELEGRAPH RELAY.

No. 450,272. Patented Apr. 14, 1891.

Witnesses
W. H. Courtland
Nellie L. Pope.

Inventor
ROBERT O. WICKES
BY HIS ATTORNEY
Edward P. Thompson

UNITED STATES PATENT OFFICE.

ROBERT O. WICKES, OF TROY, NEW YORK.

TELEGRAPH-RELAY.

SPECIFICATION forming part of Letters Patent No. 450,272, dated April 14, 1891.

Application filed December 8, 1890. Serial No. 373,920½. (No model.)

*To all whom it may concern:*

Be it known that I, ROBERT O. WICKES, a citizen of the United States, and a resident of Troy, county of Rensselaer, and State of New York, have invented certain new and useful Improvements in Telegraph-Relays, (Case 1,) of which the following is a specification.

My invention relates to the mechanical construction of a telegraph-relay.

The object of the invention is the production of a device which may be employed by those who are not necessarily expert in the management of relays.

The details are fully represented in the annexed drawings.

Figure 1:
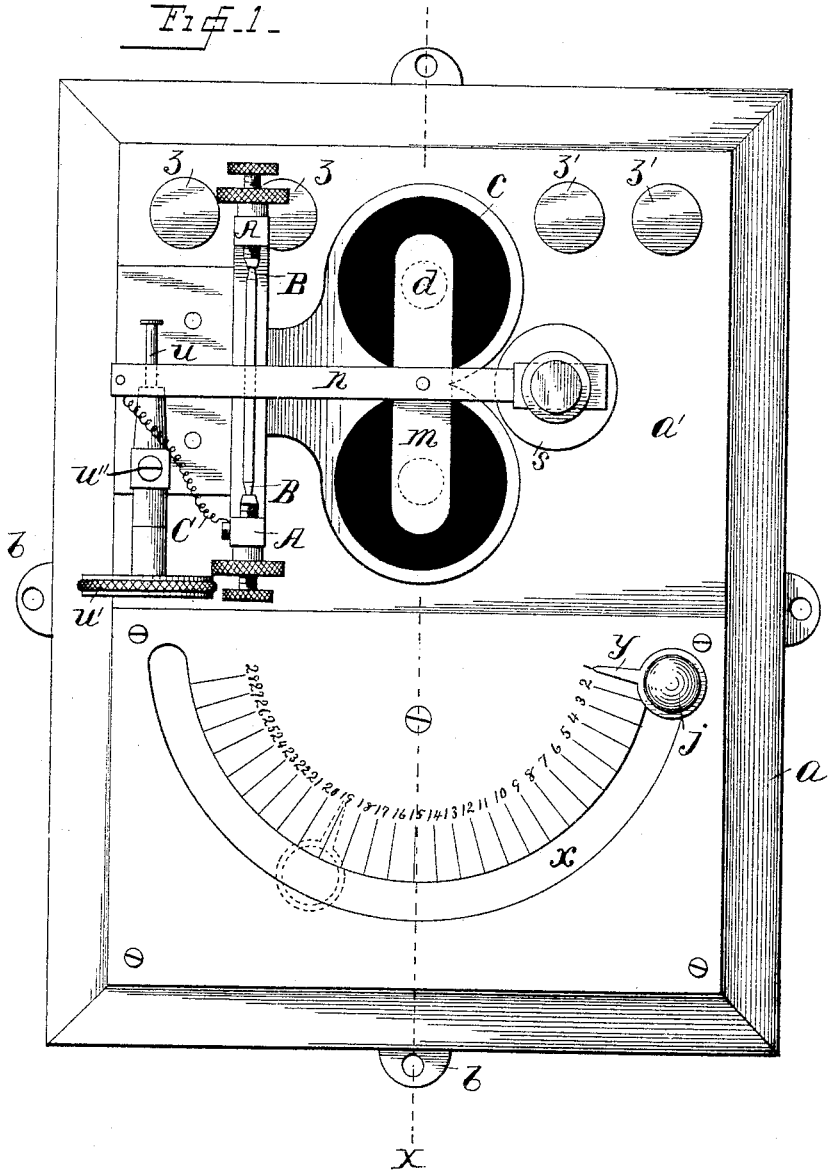
Figure 3:
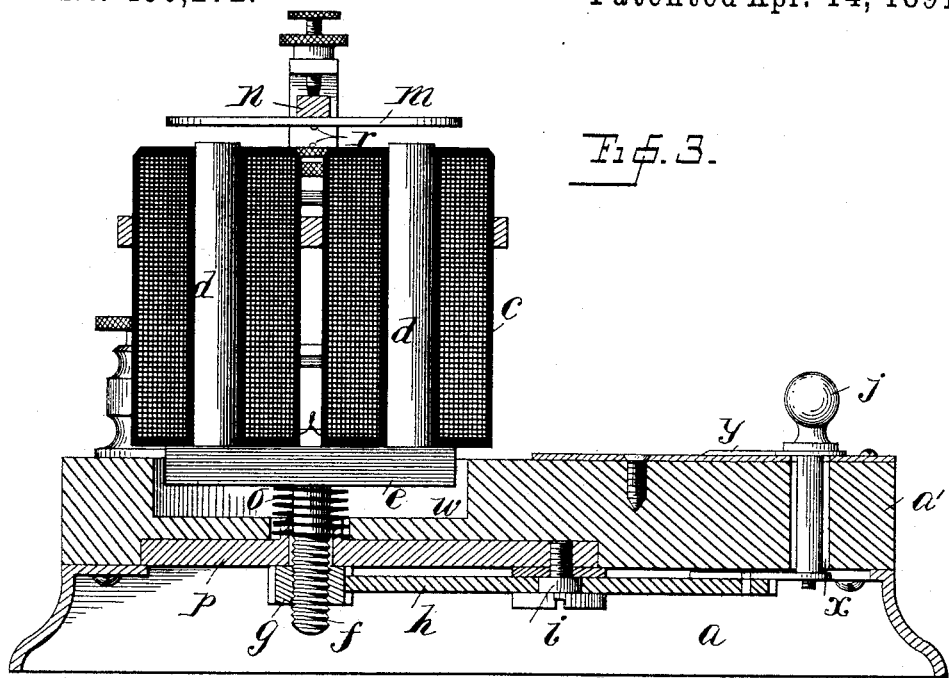
Figure 4:
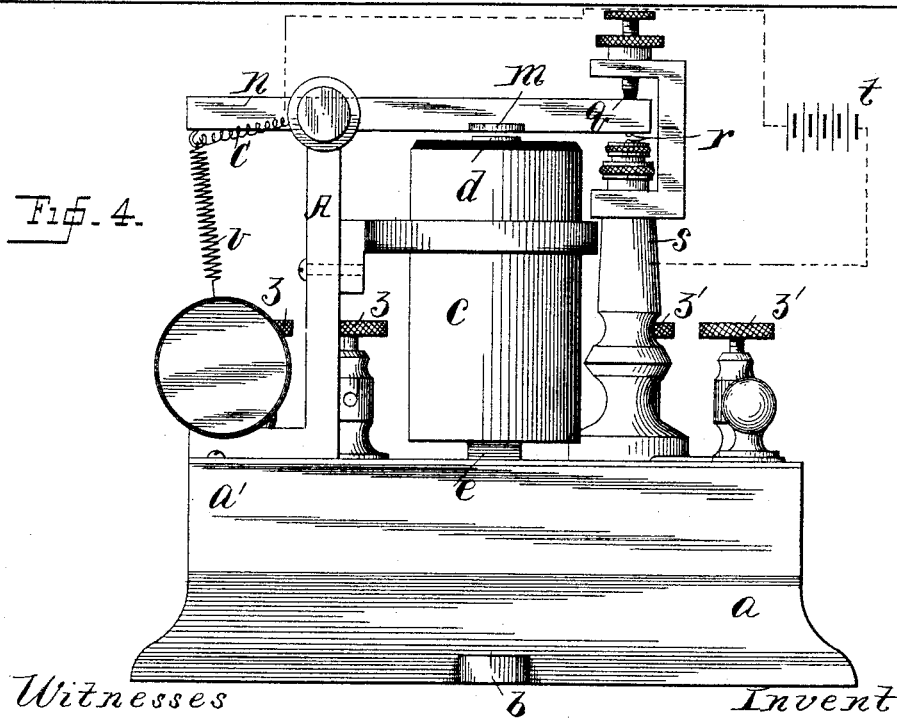

Figure 1 is a plan, Fig. 2 an inverted plan, Fig. 3 a vertical section on the line X in Fig. 1, and Fig. 4 is a side elevation, of the complete instrument. Fig. 5 is a view, partly in section, of a detail relating to the armature-regulator.

The device in all its details consists of the combination of a base-plate $a$, provided with lugs $b$, by which the instruments may be fastened to a table; electro-magnet $c$, having cores $d$ and yoke-piece $e$; a screw $f$, projecting from the said yoke-piece in the same direction as the axes of the said coils, which are parallel; a pinion $g$, screwed upon the said screw $f$ in the manner of a nut and engaging with a gear-wheel $h$, mounted upon the bearing $i$; a handle $j$, attached to said gear-wheel $h$, which is rotary through a distance of approximately .45 of a circle; an armature $m$, attached to a pivoted arm $n$ and mounted in a position directly above the poles of the magnet $c$; a helical spring $o$, one end of which presses against the yoke $e$ and the other end against a mechanical resistance, such as a stationary plate $p$, the said spring surrounding the screw $f$; a back-stop $q$ of insulation for the said lever $n$; contacts $r$, respectively located on said lever and a standard $s$, the said contacts being those of the local battery $t$; a spindle $u$, having a thumb-screw $u'$ and a set-screw $u''$; a retractile spring $v$, connected, respectively, to the lever $n$ and to the spindle $u$, the lower part of said spring being terminated by an insulating-thread $v'$ and the said spring holding normally by its tension the lever $n$ against the back-stop $q$, and other details hereinafter described. The base-plate $a$ is open, leaving space inside for the screw $f$, pinion $g$, and wheel $h$. It may be constructed of metal. An insulating-plate $a'$ is mounted on top of said base-plate and is provided with a hole $w$ for the back and forward motion of the yoke $e$ and of the spring $o$. A metallic plate $p$ is mounted on the under side of the plate $a'$ to serve as a bearing for the pinion $g$ and as an abutment for the spring $o$. The handle $j$ passes through an arc-shaped slot $x$ to a plate $j'$, which is attached to the wheel $h$ and is provided with a pointer $y$, which points to numerals 1, 2, 3, 4, 5, &c., arranged at equal distances along the slot. Two sets of binding-posts $z$ and $z'$ are provided, the latter for connecting with the battery at a distant point and the former with the local battery $t$. The internal connections are from the terminals $z'$ to the magnet $c$ and from the terminals $z$ to the contacts $r$.

The operation of the device is as follows: When the handle $j$ is moved from the right side of an instrument (referring to Fig. 1) to the left side, the wheel $h$, pinion $g$, and screw $f$ are turned in such a direction that the magnet $c$ is lowered or removed from the armature $m$ a maximum distance. When at the position shown, where the indicator $y$ points to the numeral 1, the magnet $c$ is in its uppermost position or within a minimum distance of said armature. In intermediate positions the distance between the magnet and the armature is varied. Accordingly by turning the handle $j$ the magnet may be adjusted to that position which will give the best results, and which, of course, will vary from day to day or even from hour to hour, according to the condition of the weather, of the batteries, and of the electrical connections. In order that there may be no back movement of the magnet, the spring $o$ is provided in the manner described. The said spring maintains a certain pressure between the magnet and the pinion $g$, so that the least movement of the handle $j$ in either direction and at any position will move the magnet $c$ positively without lost motion.

Another adjustment for the instrument is provided by means of the spring $v$. The tension may be increased on this spring by winding up the thread $v'$ on the spindle $u$, and it may be diminished by turning the spindle in the opposite direction. In order that the current may not be obliged to pass from the lever $n$ to the frame A through the oiled pivot-joints B, the delicate elastic electric conductor C connects said frame A to said lever, thus affording a direct path from the contacts $r$ to the battery $t$. The conductors D connect the binding-posts $z'$ to the magnets—that is, the conductors D are the terminals of the magnets. The conductors D' connect the terminals $z$ respectively to the standard $s$ and frame A.

I claim as my invention—

A telegraph-relay consisting of the combination of a magnet whose yoke is provided with a screw, a pinion provided with an internal screw-thread rotary upon said screw, a gear-wheel $h$, engaging with said pinion, means, such as a handle, for turning said wheel, a helical spring surrounding said screw and supporting said magnet, an armature for the magnet carried by a pivoted lever, which is provided with electric contact normally in open circuit with a local battery, the said magnet being in circuit with a distant battery, a retractile spring holding said armature away from said magnet, a spindle provided with a set-screw and connected with an insulating-thread, which terminates said last-named spring, and an indicating-finger $y$, mounted upon said handle and pointing to one of the divisions 1, 2, 3, 4, &c., arranged in an arc of which the center is the center of said wheel.

In testimony that I claim the foregoing as my invention I have signed my name, in presence of two witnesses, this 22d day of November, 1890.

ROBERT O. WICKES.

Witnesses:
CHAS. E. WICKES,
FRANK R. FERRIS.